US012301776B2

(12) United States Patent
Hu

(10) Patent No.: US 12,301,776 B2
(45) Date of Patent: May 13, 2025

(54) DATA PROCESSING METHOD AND APPARATUS, COMPUTER AND READABLE STORAGE MEDIUM

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 77 days.

(21) Appl. No.: 18/239,080

(22) Filed: Aug. 28, 2023

(65) Prior Publication Data

US 2023/0403383 A1   Dec. 14, 2023

Related U.S. Application Data

(63) Continuation of application No. PCT/CN2022/099726, filed on Jun. 20, 2022.

(30) Foreign Application Priority Data

Jul. 12, 2021 (CN) .......................... 202110786808.7

(51) Int. Cl.
*H04N 13/161* (2018.01)
*H04N 21/81* (2011.01)
*H04N 21/845* (2011.01)

(52) U.S. Cl.
CPC ......... *H04N 13/161* (2018.05); *H04N 21/816* (2013.01); *H04N 21/8456* (2013.01)

(58) Field of Classification Search
CPC . H04N 13/161; H04N 21/816; H04N 21/8456
See application file for complete search history.

(56) References Cited

U.S. PATENT DOCUMENTS

2017/0339392 A1\* 11/2017 Forutanpour ........ H04N 13/161
2019/0012839 A1\* 1/2019 Wang .................... G06T 19/003
(Continued)

FOREIGN PATENT DOCUMENTS

CN   112492385 A   3/2021
CN   112534825 A   3/2021
(Continued)

OTHER PUBLICATIONS

Tencent Technology, WO, PCT/CN2022/099726, Sep. 21, 2022, 4 pgs.

(Continued)

*Primary Examiner* — Thai Q Tran
*Assistant Examiner* — Jose M Mesa
(74) *Attorney, Agent, or Firm* — Morgan, Lewis & Bockius LLP

(57) ABSTRACT

Embodiments of this application provides a data processing method performed by a computer device, the method including: obtaining k component tracks in a target file, each component track having a component track data box, which comprises a segment quantity and space region information; the segment quantity referring to a quantity of atlas segments corresponding to the component track to which the component track data box belongs; the space region information referring to a space region of the component track to which the component track data box belongs; k being a positive integer; and unpacking the target file according to each component track data box, to obtain a corresponding segment display content.

18 Claims, 5 Drawing Sheets

(56) References Cited

U.S. PATENT DOCUMENTS

2019/0020880 A1* 1/2019 Wang .................... H04L 65/612
2020/0014907 A1* 1/2020 Lee ........................ H04N 21/84

FOREIGN PATENT DOCUMENTS

| CN | 112700550 A | 4/2021 |
| CN | 112804256 A | 5/2021 |
| CN | 112887733 A | 6/2021 |
| WO | WO 2021062645 A1 | 4/2021 |
| WO | WO 2021093153 A1 | 5/2021 |
| WO | WO 2021102953 A1 | 6/2021 |
| WO | WO 2021136880 A1 | 7/2021 |

OTHER PUBLICATIONS

Tencent Technology, IPRP, PCT/CN2022/099726, Jan. 16, 2024, 5 pgs.

Tencent Technology, Extended European Search Report, EP Patent Application No. 22841128.6, Sep. 9, 2024, 14 pgs.

ISO.org, "Information Technology—Coded Representation of Immersive Media—Part 10: Carriage of Visual Volumetric Video-Based Coding Data", ISO/IEC JTC1/SC 29/WG 3, Document: ISO/IEC 23090-10:2020(E), 2020, 70 pgs., Retrieved from the Internet: https://www.iso.org/obp/ui#iso:std:iso-iec:23090;-10:ed-1:v1.en.

Tencent Technology, Japanese Office Action, JP Patent Application No. 2023-554318, Oct. 10, 2024, 28 pgs.

Tencent Technology, ISR, PCT/CN2022/099726, Sep. 21, 2022, 3 pgs.

\* cited by examiner

DATA PROCESSING METHOD AND APPARATUS, COMPUTER AND READABLE STORAGE MEDIUM

CROSS-REFERENCE TO RELATED APPLICATIONS

This application is a continuation application of PCT Patent Application No. PCT/CN2022/099726, entitled "DATA PROCESSING METHOD AND APPARATUS, COMPUTER AND READABLE STORAGE MEDIUM" filed on Jun. 20, 2022, which claims priority to Chinese Patent Application No. 2021107868087, entitled "DATA PROCESSING METHOD AND APPARATUS, COMPUTER AND READABLE STORAGE MEDIUM" filed with the Chinese Patent Office on Jul. 12, 2021, all of which is incorporated by reference in its entirety.

FIELD OF THE TECHNOLOGY

This application relates to the field of computer technologies, and in particular, to a data processing method and apparatus, a computer, and a readable storage medium.

BACKGROUND OF THE DISCLOSURE

An immersive media refers to a media content that can bring immersive experiences for a user, and a point cloud is a discrete point set irregularly distributed in a space and expressing a space structure and a surface attribute of a three-dimensional (3D) object or scene. In general, the point cloud can be obtained through computer generating, 3D laser scanning, 3D photogrammetry, or other ways. With the change of point cloud obtaining approaches, it is possible to obtain a large amount of point cloud data. With continuous accumulation of large-scale point cloud data, the efficient storage, transmission, publication, sharing, standardization, etc. of the point cloud data become a key to point cloud applications. After encoding the point cloud data, an encoded data flow needs to be packed and transmitted to the user. At present, the encoded data flow is generally packed directly, and the packed data is transmitted to the user, such that part of data may lose in a process of encoding and packing the point cloud data, etc. After receiving the packed data, the user is also unable to perform a more accurate data obtaining process from the packed data, making the data processing efficiency, effect, and the like worse.

SUMMARY

According to various embodiments provided in this application, a data processing method and an apparatus, a computer, and a readable storage medium are provided.

According to an aspect the embodiments of this application, a data processing method is provided, executed by a computer device, including:
  obtaining k component tracks in a target file, each component track having a component track data box, which comprises a segment quantity and space region information; the segment quantity referring to a quantity of atlas segments corresponding to the component track to which the component track data box belongs; the space region information referring to a space region of the component track to which the component track data box belongs; k being a positive integer;
  unpacking the target file according to each component track data box, to obtain a corresponding segment display content.

According to an aspect of the embodiments of this application, a computer device is provided, which includes one or more processors, a memory, and an input/output interface; and the processors being respectively connected to the memory and the input/output interface, where the input/output interface is configured to receive data and output data, the memory is configured to store a plurality of computer-readable instructions that, when executed by the processors, cause the computer device to implement the data processing method in an aspect of the embodiments of this application.

According to an aspect of the embodiments of this application, one or more non-transitory computer-readable storage media are provided, which store a plurality of computer-readable instructions that, when executed by one or more processors of a computer device, cause the computer device to implement the data processing method of an aspect of the embodiments of this application is implemented.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

The technical solutions in embodiments of this application are clearly and completely described below with reference to the accompanying drawings in the embodiments of this application. Apparently, the described embodiments are merely some rather than all of the embodiments of this application. Based on the embodiments of this application, all other embodiments obtained by a person of ordinary skill in the art without involving an inventive effort shall fall within the scope of protection of this application.

The embodiment of this application relates to a data processing technology, which is a data packing and unpacking technology for atlas. The atlas is configured to indicate region information on a two-dimensional (2D) plane frame, region information of a 3D presentation space, a mapping relation therebetween, essential parameter information required for mapping, etc. The atlas may be an atlas corresponding to a volumetric video; the volumetric video refers to an immersive media that captures a visual content in a 3D space, provides a viewing experience such as 3 Degree of Freedom+ (3DoF+) or 6 Degree of Freedom (6DoF), and includes a volumetric video type track in a file package, including a multi-view video and a video encoded point cloud. The multi-view/multi-view point video refers to a video with depth information photographed from a plurality of angles using a plurality groups of camera arrays, is also called a free view/free view point video, and is an immersive media that provides a 6 Degree of Freedom experience. The point cloud is a discrete point set irregularly distributed in a space and expressing a space structure and a surface attribute of a 3D object or scene; each point in the point cloud at least has 3D position information, or may also have color, material, and other information according to different scenes. In general, each point in the point cloud has a same quantity of additional attributes.

Further, Degree of Freedom (DoF) refers to a degree of freedom for a motion supported and content interaction generated by a user during viewing the immersive media. 3DoF refers to three degrees of freedom that a user header rotates around coordinate axes (x axis, y axis, and z axis) of a 3D space. 3DoF+ refers to the degree of freedom further owned by the user for conducting limited movements along the x axis, y axis, and z axis based on the three degrees of freedom. 6DoF refers to the degree of freedom further owned by the user for conducting free movements along the x axis, y axis, and z axis based on the three degrees of freedom.

In some embodiments, this application is applicable to the packing and unpacking of multi-view/multi-view point videos, and volumetric videos such as Video-based Point Cloud Compression (V-PCC) point cloud media based on conventional video encoding.

Figure 1:
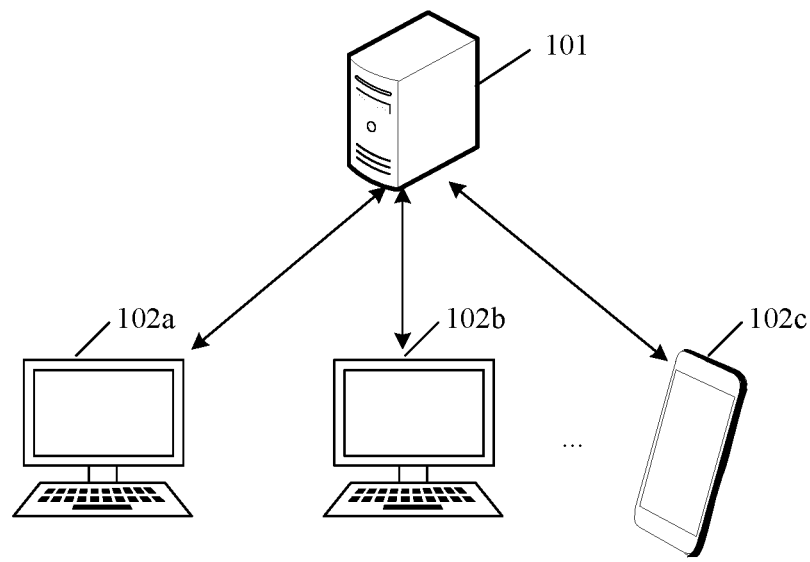
FIG. 1 is an architectural diagram of data processing according to an embodiment of this application.

Specifically, referring to FIG. 1, FIG. 1 is an architectural diagram of data processing according to an embodiment of this application. As shown in FIG. 1, the embodiment of this application is implemented by a computer device 101, which can be composed of a server and a terminal device; the computer device 101 can further be a server or a terminal device, which is not limited herein.

For example, the computer device 101 may obtain data of the volumetric video including an atlas corresponding to the volumetric video, the atlas is composed of N atlas segments, and N is a positive integer. In some embodiments, the computer device 101 may obtain one or at least two volumetric videos, and it may be considered that one volumetric video corresponds to one atlas, or, one volumetric video corresponds to at least two atlases, or, at least two volumetric videos can correspond to one atlas. In some embodiments, when a volumetric video corresponds to at least two atlases, then the computer device 101 can add an atlas identifier for each atlas, and can determine the volumetric video to which the atlas belongs, based on the atlas identifier. Specifically, the computer device 101 can obtain k component tracks needing to be packed and atlas segments corresponding to each component track, where the component track includes a component track data box, and the computer device 101 can pack the k component tracks and the atlas segments corresponding to each component track based on the component track data box respectively included in the k component tracks, to obtain a target file, and k is positive integer. The computer device 101 can send the target file to a user device, such as a user device 102a, a user device 102b, a user device 102c, etc. Specifically, the computer device 101 can receive a file obtaining request of the user device for a target file, and send the target file to the user device based on the file obtaining request. Or, the computer device 101 may obtain a data obtaining request of the user device for a volumetric video, and obtain k component tracks associated with the volumetric video and the atlas segments corresponding to each component track based on the data obtaining request, and pack the k component tracks and the atlas segments corresponding to each component track based on the component track data box included in each component track to obtain a target file. In some embodiments, the computer device 101 can obtain the atlas corresponding to the volumetric video, and segment the atlas to obtain the atlas segments included in the atlas; meanwhile, when segmenting the atlas, the component tracks associated with each atlas segment can be obtained based on the video information of the volumetric video, and the k component tracks and the atlas segments corresponding to each component track are obtained according to the association of the component track and the atlas segment.

In other words, when receiving an obtaining request of target data, the computer device 101 can obtain k component tracks associated with the target data and the atlas segments corresponding to each component track, pack, based on the component track data box respectively included in each component track, the k component tracks and the atlas segments corresponding to each component track to obtain a target file, and send the target file to the user device starting the obtaining request for target data. The target data may be a target file, and at this time, the target file can be generated in advance. The target data may be a volumetric video, and at this time, the target file can be generated in advance, or can also be generated after receiving the obtaining request for the target data; the target data can also be a component track, that is, the target data includes k component tracks, and the computer device can obtain the atlas segment corresponding to the target data, which is not limited herein.

In some embodiments, the data in this application may be stored in a computer device, or may also be stored based on a blockchain technology or a cloud storage technology, etc., that is, the data in this application may also be stored in a blockchain network or a cloud space, which is not limited herein. For example, the computer device 101 may store the k component tracks and the atlas segments corresponding to each component track, as well as component association information for each component track, the target file obtained by packing the k component tracks and the atlas segments corresponding to each component track, etc., at one or any (at least two) positions in the computer device 101, the blockchain network, or the cloud space, etc. The computer device 101 can store the data in this application at a position to save resources; or can also be stored in a plurality of positions to insure the security of the data.

In the embodiments of this application, through packing a component track data box into each component track, the component track data box being used for representing component association information of the corresponded component track, the component association information of each component track can be obtained, information of the component track can be retained as comprehensively as possible, and the information of the component track in the packed target file is more organized and refined, so that the user device receiving the target file can unpack and obtain the required component track based on the component track data box of each component track, saving the time and resources consumed on data processing.

Figure 2:
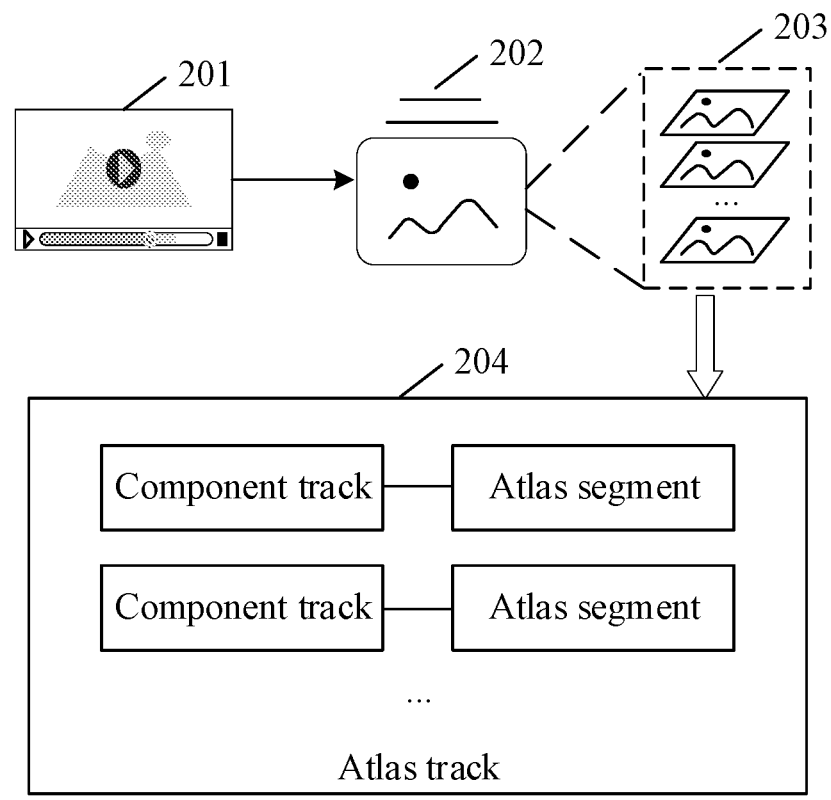
FIG. 2 is a schematic diagram of a component track generating scene according to an embodiment of this application.

Further, referring to FIG. 2, FIG. 2 is a schematic diagram of a component track generating scene according to an embodiment of this application. As shown in FIG. 2, taking a volumetric video corresponding to an atlas as an example, the embodiment of this application is implemented by a computer device, the computer device may obtain a volumetric video 201, perform analysis and information extraction on the volumetric video 201 to obtain an atlas 202 of the volumetric video 201, and perform an atlas segment on the atlas 202 of the volumetric video 201 to obtain N atlas segments 203 corresponding to the atlas 202, specifically, atlas segment can be performed on the atlas 202 of the volumetric video 201 according to regions. The component tracks respectively corresponding to the N atlas segments 203 are obtained based on the volumetric video 201, and an atlas track 204 is obtained according to the association between the atlas segments and the component tracks. Specifically, the computer device obtains the component tracks respectively corresponding to the N atlas segments 203, which may be obtaining segment information of each atlas segment, determining a component track type respectively corresponding to each atlas segment according to the segment information type corresponding to the segment information, and obtaining a component track respectively corresponding to each atlas segment according to the component track type corresponding to each atlas segment. For example, if the segment information type corresponding to the segment information is a color information type, the computer device may determine the component track type corresponding to the atlas segment associated with the segment information as an attribute component type; and if the segment information type corresponding to the segment information is a position information type, the computer device may determine the component track type corresponding to the atlas segment associated with the segment information as a geometric component type, etc. The atlas track 204 can be a track including a group of component tracks, that is, the atlas track 204 may include at least two component tracks and atlas segments corresponding to each component track, respectively. An atlas segment can correspond to a component track, or can also correspond to at least two component tracks, or a component track can also correspond to at least two atlas segments, etc., which is not limited herein. In some embodiments, if the computer device generates a target file corresponding to the volumetric video, the quantity of the at least two component tracks is k.

Figure 3:
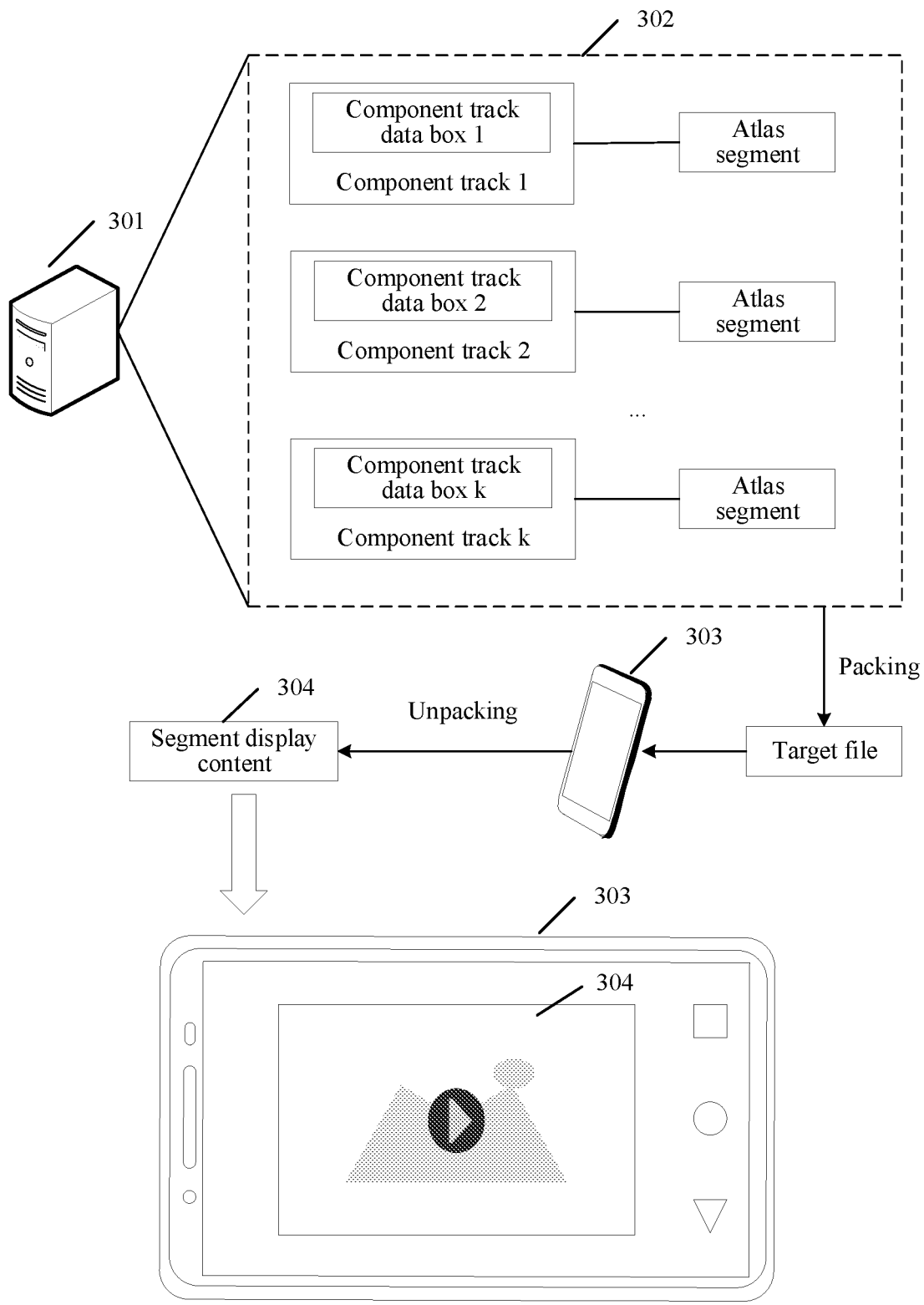
FIG. 3 is a schematic diagram of a data processing scene according to an embodiment of this application.

Further, referring to FIG. 3, FIG. 3 is a schematic diagram of a data processing scene according to an embodiment of this application. As shown in FIG. 3, a computer device 301 can obtain component association information 302 respectively corresponding to k component tracks, including k component tracks and atlas segments respectively corresponding to each component track, such as a component track 1 and atlas segments corresponding to the component track 1, a component track 2 and atlas segments corresponding to the component track 2, a component track k and atlas segments corresponding to the component track k, and the like. Each component track includes a component track data box, the computer device 301 can pack the k component tracks and the component association information 302 of each component track to obtain a target file, and send the target file to a user device 303. The user device 303 can obtain a required component track from the target file, and unpack the component association information of the component track to obtain a segment display content 304. Further, the user device 303 can display the segment display content 304.

It can be understood that the computer device includes, but not limited to, a terminal device or a server, and may be regarded as a User Equipment (UE), and the user device may include, but not limited to, a terminal device or a server. In other words, the computer device may be a server or a terminal device, and may also be a system composed of a server and a terminal device. The terminal device mentioned above may be an electronic device, including, but not limited to, a cell phone, a tablet, a desktop computer, a laptop, a palmtop computer, a vehicle-mounted device, an augmented reality/virtual reality (AR/VR) device, a helmet display, a smart television, a wearable device, a smart speaker, a digital camera, a camera and other mobile Internet devices (MID) having a network access capability, or a terminal device in a scene such as a train, a ship, and a flight. The server mentioned above may be an independent physical server, may also be a server cluster or a distributed system composed of multiple physical servers, and may further be a cloud server that provides basic cloud computing services such as cloud services, cloud databases, cloud computing, cloud functions, cloud storage, network services, cloud communication, middleware services, domain name services, security services, vehicle-road cooperation, Content Delivery Network (CDN), and big data and artificial intelligence platforms.

"Or" in this application refers to any one or more of a plurality, for example, "A or B" refers to "A", "B" and "A and B".

Figure 4:
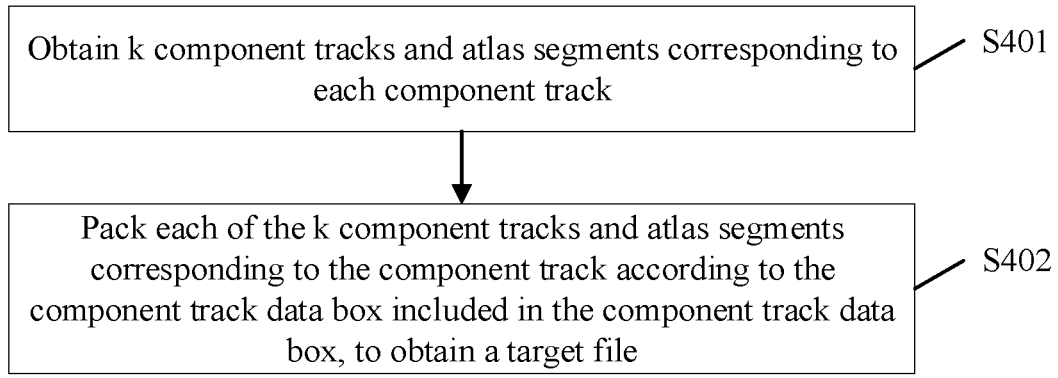
FIG. 4 is a flowchart of a data packing method according to an embodiment of this application.

Further, referring to FIG. 4, FIG. 4 is a flowchart of a data packing method according to the embodiment of this application. As shown in the FIG. 4, the data packing process includes the following steps:

Step S401: Obtain k component tracks and atlas segments corresponding to each component track.

Specifically, each component track includes a component track data box, which includes a segment quantity (which can be recorded as num_tiles) and space region information (which can be recorded as 3D_spatial_region_flag); the segment quantity refers to a quantity of atlas segments corresponding to a component track to which the component track data box belongs; the space region information refers to a space region of the component track to which the component track data box belongs; k is a positive integer. In some embodiments, the component track data box may further include an atlas identifier, an atlas segment identifier, etc.

In some embodiments, one or at least two pieces of track group division information can exist, and each track group division information corresponds to one track group division method. The track group division information can be changed according to requirements, such as adding the track group division information or deleting the track group division information.

In a track group division method, atlas segments corresponding to each component track include a first atlas segment and a second atlas segment, that is, the first atlas segment included in a first component track and the second atlas segment included in a second component track; when an atlas identifier associated with a first atlas segment identifier of the first atlas segment is the same as an atlas identifier associated with a second atlas segment identifier of the second atlas segment, the first atlas segment and the second atlas segment belong to a same segment track group, that is, the first component track corresponding to the first atlas segment and the second component track corresponding to the second atlas segment can be added into the same segment track group. At this time, it can be considered that each segment track group is configured to represent the information of the component tracks corresponding to one atlas, that is, the atlas segments corresponding to the component track in one segment track group belongs to the same atlas.

In the track group division method, the component track further includes a component track type. Assuming that k component tracks include the first component track and the second component track, when a first component track type of the first component track is the same as a second component track type of the second component track and the atlas identifier associated with atlas segment corresponding to the first component track is the same as the atlas identifier associated with the atlas segment corresponding to the second component track, the atlas segment corresponding to the first component track and the atlas segment corresponding to the second component track belong to a same segment track group. That is to say, the component track types of the component tracks included in the same segment track group are the same, and the atlas segments corresponding to the component track belong to the same atlas.

The component track data box may include a track group data box, and the track group data box includes an atlas identifier and an atlas segment identifier; the atlas identifier represents an identifier of an atlas to which the atlas segment belongs. In some embodiments, when the atlas segment identifier is associated with the atlas identifier, the atlas segment corresponding to the atlas segment identifier belongs to the atlas corresponding to the atlas identifier. The track group data box can further include a segment quantity and space region information.

In some embodiments, the component track data box can include a component information data box, the component information data box can include a data box type, and the data box type represents that the component information data box indicates information of the component track to which the component information data box belongs; the k component tracks include a target component track. Specifically, the component information data box can include a data box type, a parent level data box to which the component information data box belongs (such as a data box of SchemeInformationBox), an execution state (including a forced execution state, an optional execution state, etc.), a data box quantity, and the like, and the component information data box can further include a segment quantity, space region information, an atlas identifier, and the like. When the component information data box is packed in the target component track, the component information data box indicates the atlas segments corresponding to the target component track and space information.

In some embodiments, the component track data box can include one or at least two of the track group data box or the component information data box, where the positions of the track group data box and the component information data box in the component track are different.

Figure 5:
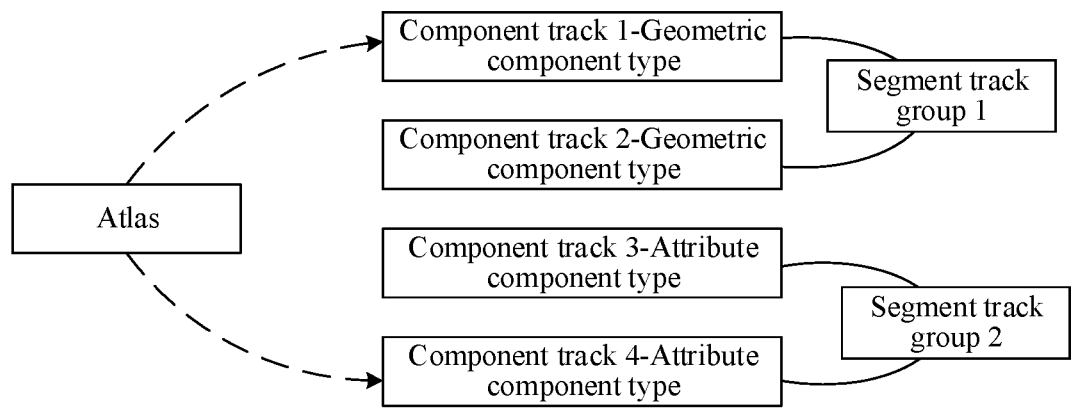
FIG. 5 is a schematic diagram of track group division according to an embodiment of this application.

For example, referring to FIG. 5, FIG. 5 is a schematic diagram of track group division according to an embodiment of this application. As shown in FIG. 5, the computer device obtains k component tracks and atlas segments corresponding to each component track, for example, a component track 1 (recorded as track11), a component track 2 (recorded as track12), a component track 3 (recorded as track13), and a component track 4 (recorded as track14), where the component track type corresponding to track11 is a geometric component type, which corresponds to atlas segment 1 (recorded as tile1); the component track type corresponding to track12 is a geometric component type, which corresponds to an atlas segment 2 (recorded as tile2); the component track type corresponding to track13 is an attribute component type, which corresponds to an atlas segment 3 (recorded as tile3); the component track type corresponding to track14 is an attribute component type, which corresponds to an atlas segment 4 (recorded as tile4). In some embodiments, the component track type can include, but not limited to, a placeholder diagram component type, a geometric component type, an attribute component type, a packing component type, and the like.

Step S402: Pack each of the k component tracks and the atlas segments corresponding to the component track according to the component track data box included in the component track, to obtain a target file.

Specifically, the computer device can obtain track group division information, and based on the track group division information, obtains component track information of the k component tracks from the component track data boxes respectively included in the k component tracks; the track group division information represents a grouping mode of the k component tracks. For example, the track group division information is configured to indicate a track group division method based on an atlas, therefore, the component track information obtained by the computer device may include the atlas to which the atlas segments respectively corresponding to the k component tracks belong; the track group division information is configured to indicate a track group division method based on an atlas and the component track type, therefore, the component track information obtained by the computer device may include the atlas to which the atlas segments respectively corresponding to the k component tracks belong, the component track type of each component track, etc. Divide the k component tracks based on the track group division information and the component track information to obtain M segment track groups, and M is a positive integer. Pack the M segment track groups and atlas segments associated with each segment track group to obtain a target file.

Specifically, in a track group division method, the track group division information includes atlas division information, and the component track information of the k component tracks includes atlas identifiers associated with the atlas segments respectively corresponding to the k component tracks; and the atlas identifier represents an identifier of an atlas to which the atlas segment belongs. When the k component tracks are divided based on the track group division information and the component track information to obtain M segment track groups, the computer device can group the component tracks corresponding to the atlas segments associated with the same atlas identifier among the k component tracks based on the atlas division information to obtain M segment track groups.

In a track group division method, the track group division information includes atlas component division information, and the component group information of the k component tracks includes an atlas identifier associated with the atlas segments respectively corresponding to the k component tracks, and a component track type respectively corresponding to the k component tracks; and the atlas identifier represents an identifier of an atlas to which the atlas segment belongs. When the k component tracks are divided based on the track group division information and the component track information to obtain M segment track groups, the computer device can group the component tracks having the same component track type and associated with the same atlas identifier among the k component tracks based on the atlas component division information to obtain M segment track groups.

In some embodiments, the computer device can determine component track types respectively corresponding to the k component tracks and an atlas identifier to which the atlas segments respectively corresponding to the k component tracks belongs, based on the component track information; the atlas identifier represents an identifier of an atlas of a volumetric video to which the atlas segment belongs. When a component track to be divided exists among the k component tracks, dividing a component track to be divided into at least two component sub-tracks based on the atlas identifier to which the atlas segments corresponding to the component track to be divided belong; the component track to be divided referring to a component track that corresponds to at least two atlas segments, wherein atlas identifiers respectively corresponding to the at least two atlas segments are different; and the atlas segments corresponding to the same component sub-track being associated with the same atlas identifier. For example, exists a component track A which corresponds to an atlas segment 1 and an atlas segment 2, wherein the atlas segment 1 corresponds to an atlas identifier 1 and the atlas segment 2 corresponds to an atlas identifier 2, therefore can determine the component track A as a component track to be divided, and divided the component track to be divided to at least two component sub-tracks, including a component sub-track 1 (corresponding to the atlas segment 1) and a component sub-track 2 (corresponding to the atlas segment 2). Further, determines the at least two component sub-tracks and a conventional component track as candidate component tracks; and the conventional component track referring to a component track in the k component tracks except the component track to be divided. Divide the candidate component tracks having the same component track type and associated with the same atlas identifier to obtain M segment track groups.

Obtain an track index i of component track type information corresponding to an i-th segment track group in the M segment track groups; i is a positive integer less than or equal to M. Add the track index i for the i-th segment track group, and based on the track index i, associate the i-th segment track group with the atlas segments corresponding to the component track included in the i-th segment track group. According to an association result, pack the M segment track groups and atlas segments associated with each segment track group to obtain a target file. The track index can be represented by a character string, the character string may generated according to a generation order of the track index, that is, it can represent the generation order of the track index; or it can be a randomly generated unique index, or it can be determined based on the data type carried by the component track, which is not limited herein.

For example, the track index can be seen in Table 1:

| Track index type | Description |
| --- | --- |
| v3vo | An indexed component track is a component track that carries a placeholder diagram data (that is, data corresponding to a placeholder diagram component type) |
| v3vg | An indexed component track is a component track that carries a geometry data (that is, data corresponding to a geometric component type) |
| v3va | An indexed component track is a component track that carries an attribute data (that is, data corresponding to an attribute component type) |
| v3vp | An indexed component track is a component track that carries a packing data (that is, data corresponding to a packing component type) |
| . . . | . . . |

As shown in Table 1, the track index includes but not limited to v3vo, v3vg, v3va and v3vg, etc., and the track index can represent a component track type of a component track included in a corresponding segment track group. When determine the segment track group based on the component track type, the component track types in the component tracks included in each segment track group are the same, and the component track types of the component tracks included in the segment track group can be represented based on the track index to reduce the amount of data to be processed. For example, when the component track types of component tracks 1 to 10 are all geometric component type, the computer device can divide the component tracks 1 to 10 into a segment track group and identify the segment track group based on the track index "v3vg", such that there is no need to carry the component track type for each component track, thereby reducing the amount of data to be processed.

For example, as shown in FIG. 5, it can be learned that the component track 1 (track11) and the component track 2 (track12) both correspond to the geometric component type, and the component track 3 (track13) and the component track 4 (track14) both correspond to the attribute component types. The computer device, based on the component track type, can put the track11 and the track12 into one track group, i.e. segment track group 1, and put the track13 and the track14 into one track group, i.e. segment track group 2. In some embodiments, based on Table 1, the track index "v3vg" can be configured to identify the segment track group 1, and associated atlas segments respectively corresponding to the track11 and track12 to the segment track group 1, and can further associated the segment track group 1 to an atlas track (as shown in FIG. 2); and the track index "v3va" can be configured to identify the segment track group 2, and associated atlas segments respectively corresponding to the track13 and track14 to the segment track group 2, and can further associated the segment track group 2 to an atlas track (as shown in FIG. 2).

The embodiments of this application can obtain k component tracks and atlas segments corresponding to each component track; the component track includes a component track data box, which includes a segment quantity and space region information; the segment quantity refers to a quantity of atlas segments corresponding to a component track to which the component track data box belongs; the space region information refers to a space region of the component track to which the component track data box belongs; k is a positive integer; and pack the k component tracks and atlas segments corresponding to each component track according to the component track data box, to obtain a target file. Through the above process, a component track data box can be packed in each component track, and the component track data box indicates the relevant information of the component track, which can refine the association between the atlas segment information and the component track (i.e., atlas segment and component track) to the granularity of a single component track, such that the information of the component track can be retained as comprehensively as possible, and the information of the component track in the packed target file can be more organized and refined. Further, after sending the target file to a user device, the user device can select the required component track precisely to achieve the purposes of partial unpacking and partial decoding, such that there is no need to fully unpack and decode the target file, so as to save time and resources consumed on data processing, thus improving the accuracy and efficiency of data processing.

Figure 6:
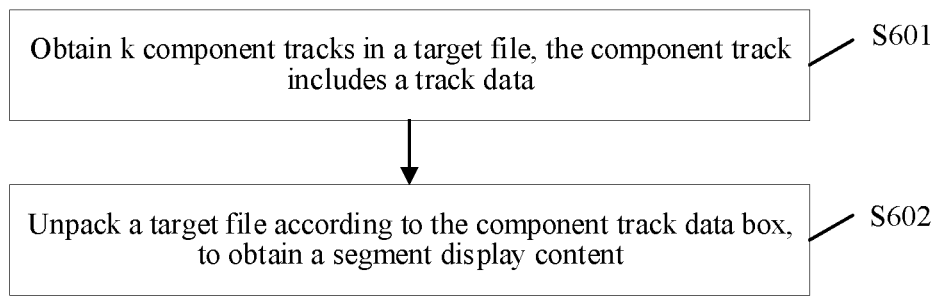
FIG. 6 is a flowchart of a data unpacking method according to an embodiment of this application.

Further, Referring to FIG. 6, FIG. 6 is a flowchart of a data unpacking method according to the embodiment of this application. As shown in FIG. 6, the following steps are included:

Step S601: Obtain k component tracks in a target file, the component track includes a track data box.

Specifically, the component track includes the component track data box, which includes a segment quantity and space region information; the segment quantity refers to a quantity of atlas segments corresponding to a component track to which the component track data box belongs; the space region information refers to a space region of the component track to which the component track data box belongs; and k is a positive integer.

Step S602: Unpack a target file according to a component track data box, to obtain a segment display content.

Specifically, when responding to a display request for a target component track, obtain a target component track data box included in the target component track from the target file, and obtain a target segment quantity corresponding to the target component track from the target component track data box. The position of the target component track data box in a component track is learned, the computer device can obtain a data box position, and obtain the target component track data box at the data box position in the target component track. In some embodiments, the target component track data box may be a track group data box or a component information data box, or may include a track group data box and a component information data box. When the computer device determined the target component track data box which included in the target component track, and obtained the target data box position of the target component track data box, thus obtaining the target component track data box at the target data box position in the target component track. When the computer device has not obtained constituent elements of the target component track data box, or the target component track data box includes a track group data box and a component information data box, it can obtain a first data box position corresponding to the track group data box and a second data box position corresponding to the component information data box, perform a search at the first data box position and the second data box position of the target component track, and perform post-processing based on the searched data box, in other words, the track group data box and the component information data box can replace each other, and are essentially config-ured to represent the same information. The target component track can be any component track in the k component tracks.

Further, the computer device can perform h iterative unpacking's on the target file to obtain the segment display content corresponding to the target component track, based on the quantity of target segments; and h is the target segment quantity. In other words, the target component track corresponds to h atlas segments, and performs h iterative unpacking's on the target component track in the target file to obtain atlas segment information respectively corresponding to h atlas segments.

When responding to a display request for an atlas segment to be processed, obtain an atlas segment identifier to be processed of the atlas segment to be processed. Obtain component track data boxes respectively included in the k component tracks from the target file, and based on the segment quantity and the atlas segment identifier to be processed in the component track data box, perform traverse searching on the component track data boxes respectively included in the k component tracks. Specifically, The component track corresponds to h atlas segments, that is, component track data boxes included in the component track include atlas segment identifiers of the h atlas segments corresponding to the component track, and based on the segment quantity h, the computer device can perform traverse searching on the atlas segment identifiers in the component track data boxes respectively included in the k component tracks. When the atlas segment identifiers to be processed are not obtained even after h times of searching, it means that the atlas segment identifiers to be processed do not exist in the currently searched component track. Further, determine a searched component track to which the component track data box of the atlas segment identifier to be processed as a component track to be processed; unpack the component track to be processed to obtain a segment display content corresponding to the atlas segment to be processed. As shown in FIG. 5, when the atlas segment to be processed is tile1, then the computer device performs traverse searching on the component track data boxes respectively included in the k component tracks, to obtain component tracks to be processed, which include a component track 1 and a component track 3.

Further in some embodiments, the computer device can unpack a target file according to the component track data box, to obtain the k component tracks and atlas segments corresponding to each component track; determine a space region where the k component tracks are located in a volumetric video based on space region information in the component track data box included in the k component tracks, respectively; and according to the space region where the k component tracks are located in the volumetric video and the atlas segments corresponding to each component track, generate a segment display content.

In some embodiments, when responding to a display request for a target component track, the computer device can obtain a target track component from a target file, and unpack the target track component according to the target component track data box included in the target track component to obtain an encoding bit stream corresponding to the target track component; decode the encoding bit stream, and generate a decoding signal corresponding to the encoding bit stream; obtain atlas segment data corresponding to the target component track, and determine, based on atlas segment data, point cloud information of the atlas segments corresponding to the target component track; and determine a segment display content corresponding to the target component track based on the point cloud information.

The embodiments of this application can obtain k component tracks and atlas segments corresponding to each component track; the component track includes the component track data box, which includes a segment quantity and space region information; the segment quantity refers to a quantity of atlas segments corresponding to a component track to which the component track data box belongs; the space region information refers to a space region of the component track to which the component track data box belongs; and k is a positive integer; and pack the k component tracks and atlas segments corresponding to each component track according to the component track data box, to obtain a target file. Through the above process, a component track data box can be packed in each component track, and the component track data box indicates the relevant information of the component track, which can refine the association between the atlas segment information and the component track (i.e., atlas segment and component track) to the granularity of a single component track, such that the information of the component track can be retained as comprehensively as possible, and the information of the component track in the packed target file can be more organized and refined. Further, after sending the target file to a user device, the user device can select the required component track precisely to achieve the purposes of partial unpacking and partial decoding, such that there is no need to fully unpack and decode the target file, so as to save time and resources consumed on data processing, thus improving the accuracy and efficiency of data processing.

Figure 7:
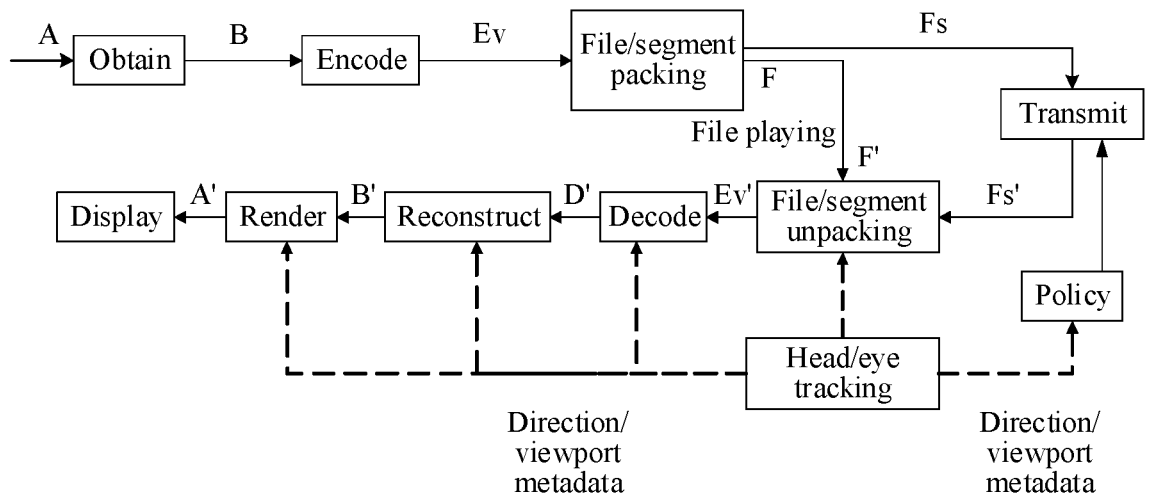
FIG. 7 is a schematic diagram of a data processing scene according to an embodiment of this application.

Further, referring to FIG. 7, FIG. 7 is a schematic diagram of a data processing scene according to an embodiment of this application. As shown in FIG. 7, a real world or synthetic visual scene (A) is captured by a group of cameras or virtual cameras; one camera has multiple lenses and sensors; and the real world or synthetic visual scene (A) can refer to a volumetric video, etc. The collection result of the computer device is source volumetric data (B), which is encoded to obtain an encoded V3C bit stream (Ev) that includes an atlas bit stream, at most one occupancy bit stream, a geometry bit stream, and zero or at least one attribute bit stream. Further, according to a particular media container file format, the computer device can perform file/segment packing on one or more encoded V3C bit streams to obtain a media file (F) for local replay or a sequence of an initialized segment and media segment (Fs) for streaming transmission. The media container file format may be ISO basic media file format stipulated in ISO/IEC 14496-12. Based on a delivery mechanism, the sequence of the initialized segment and media segment (Fs) can be sent to the user device.

Further, a media file (F) outputted by a file encapsulator is the same as a file (F') as an input by a file decapsulator. The file decapsulator can process a file (F') or a received segment (Fs'), that is, perform file/segment unpacking on a processing file (F') or a received segment (Fs'), extract the encoding bit stream (Ev'), and decode the encoding bit stream to obtain a decoding signal (D'). Based on the current viewing direction or viewport, the decoding signal (D') is reconstructed to obtain reconstruction information (B'), the reconstruction information (B') is rendered to obtain a segment display content (A'), and the segment display content (A') can be displayed in the user device, such as displaying on the screen of a head-mounted display or any other display device. In some embodiments, the current viewing direction is determined by a head tracking or eye tracking function. In some embodiments, the computer device can send the current viewing direction to the policy module, and determine the trajectory to be received based on the policy module.

When performing file/segment packing on one or more encoding V3C bit streams, various steps shown in FIG. 4 in this application can be adopted to pack the one or more encoding V3C bit streams to obtain a target file, which includes a media file (F) or the sequence (Fs) of the initialized segment and media segment. When performing file/segment unpacking on the processing file (F') or the received segment (Fs'), various steps of FIG. 6 can be adopted to perform file/segment unpacking on the processing file (F') or the received segment (Fs') to obtain the segment display content.

Figure 8:
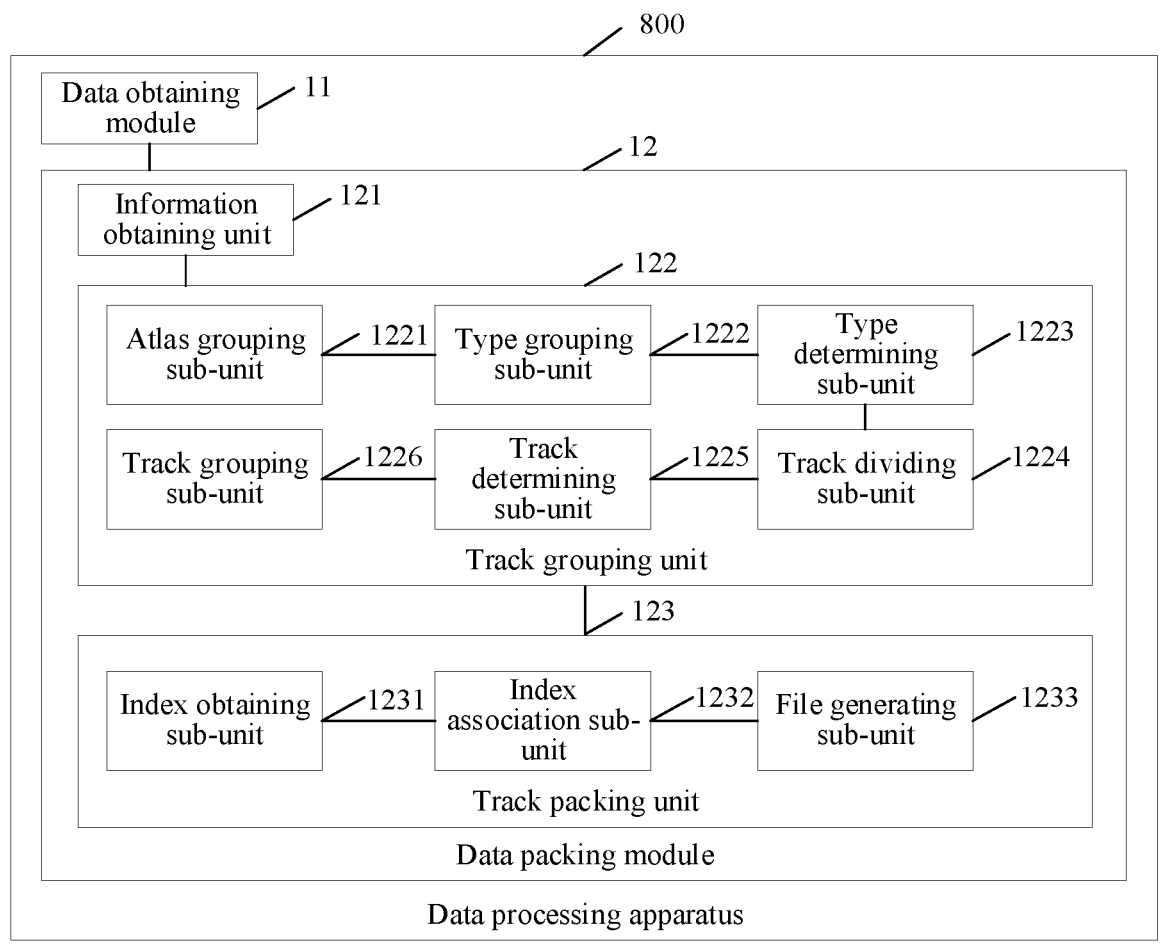
FIG. 8 is a schematic diagram of a data processing apparatus according to an embodiment of this application.

Referring to FIG. 8, FIG. 8 is a schematic diagram of a data processing apparatus according to an embodiment of this application. The data processing apparatus can be a computer-readable instruction (including a program code) running in the computer device, for example, the data processing apparatus is application software; the apparatus can be configured to execute corresponding steps in the method provided in the embodiments of this application. As shown in FIG. 8, a data processing apparatus 800 can be used for the computer device in the embodiment corresponding FIG. 4. Specifically, the apparatus may include: a data obtaining module 11 and a data packing module 12.

The data obtaining module 11 is configured to obtain k component tracks and atlas segments corresponding to each component track; the component track includes the component track data box, which includes a segment quantity and space region information; the segment quantity refers to a quantity of atlas segments corresponding to a component track to which the component track data box belongs; the space region information refers to a space region of the component track to which the component track data box belongs; and k is a positive integer; and the data packing module 12 is configured to pack the k component tracks and the atlas segments corresponding to each component track according to the component track data box, to obtain a target file.

The component track data box includes a track group data box; the track group data box includes an atlas identifier and an atlas segment identifier; the atlas identifier represents an identifier of an atlas to which the atlas segment belongs;
when the atlas segment identifier is associated with the atlas identifier, an atlas segment corresponding to the atlas segment identifier belongs to an atlas of a volumetric video corresponding to the atlas identifier.

The component track data box includes a track group data box; the track group data box includes an atlas identifier and an atlas segment identifier; the atlas identifier represents an identifier of an atlas to which the atlas segment belongs; atlas segments corresponding to each component track includes a first atlas segment and a second atlas segment;
when an atlas identifier associated with a first atlas segment identifier of the first atlas segment is the same as an atlas identifier associated with a second atlas segment identifier of the second atlas segment, the first atlas segment and the second atlas segment belong to the same segment track group.

The component track further includes a component track type; k component tracks include a first component track and a second component track; and
when a first component track type of the first component track is the same as a second component track of the second component track, the atlas segments corresponding to the first component track and the atlas segments corresponding to the second component track belong to the same segment track group.

The component track data box includes a component information data box, which includes a data box type, and the data box type represents that the component information data box indicates information of the component track to which the component information data box belongs; the k component tracks include a target component track;

when the component information data box is packed in the target component track, the component information data box indicates atlas segments corresponding to the target component track and space information.

The data packing module 12 includes:
an information obtaining unit 121, configured to obtain track group division information, and based on the track group division information, obtain component track information of the k component tracks from component track data boxes respectively included in the k component tracks; the track group division information representing a grouping mode of the k component tracks;

a track grouping unit 122, configured to divide the k component tracks based on the track group division information and the component track information to obtain M segment track groups; M being a positive integer;

a track packing unit 123, configured to pack the M segment track groups and atlas segments associated with each segment track group to obtain a target file.

The track group division information includes atlas division information, and the component track information of the k component tracks includes atlas identifiers associated with atlas segments corresponding to the k component tracks respectively; and the atlas identifier represents an identifier of an atlas of a volumetric video to which the atlas segment belongs;

the track grouping unit 122 includes:
an atlas grouping sub-unit 1221, configured to, among the k component tracks, based on the atlas division information, group component tracks corresponding to the atlas segments associated with the same atlas identifier, to obtain M segment track groups.

The track group division information includes atlas component division information, and the component track information of the k component tracks includes an atlas identifier associated with atlas segments corresponding to the k component tracks respectively, and a component track type corresponding to the k component tracks respectively; the atlas identifier represents an identifier of an atlas to which the atlas segment belongs;

the track grouping unit 122 includes:
a type grouping sub-unit 1222, configured to, among the k component tracks, based on the atlas component division information, group component tracks having the same component track type and associated with the same atlas identifier to obtain M segment track groups.

The track grouping unit 122 includes:
a type determining sub-unit 1223, configured to determine component track types respectively corresponding to the k component tracks and an atlas identifier to which the atlas segments respectively corresponding to the k component tracks based on the component track information; the atlas identifier represents an identifier of an atlas of a volumetric video to which the atlas segment belongs;

a track divided sub-unit 1224, configured to divide a component track to be divided into at least two component sub-tracks based on the atlas identifier to which the atlas segments corresponding to the component track to be divided belong, when a component track to be divided exists among the k component tracks. The component track to be divided refers to a component track that corresponds to at least two atlas segments, wherein atlas identifiers respectively corresponding to the at least two atlas segments are different; the atlas segments corresponding to the same component sub-track being associated with the same atlas identifier.

A track determining sub-unit 1225 is configured to determine at least two component sub-tracks and a conventional component track as candidate component tracks; the conventional component track refers to a component track in the k component tracks except the component track to be divided;

a track grouping sub-unit 1226 is configured to divide the candidate component tracks having the same component track type and associated with the same atlas identifier to obtain M segment track groups.

The track packing unit 123 includes:
an index obtaining sub-unit 1231, configured to obtain an track index i of component track type information corresponding to an i-th segment track group in the M segment track groups; i is a positive integer less than or equal to M;

an index association sub-unit 1232 is configured to add the track index i for the i-th segment track group, and based on the track index i, associate the i-th segment track group with the atlas segments corresponding to the component track included in the i-th segment track group;

a file generating sub-unit 1233 is configured to, according to an association result, pack the M segment track groups and atlas segments associated with each segment track group to obtain a target file.

According to the embodiments of this application, a data processing apparatus is provided, which can obtain k component tracks and atlas segments corresponding to each component track; the component track includes a component track data box, which includes a segment quantity and space region information; the segment quantity refers to a quantity of atlas segments corresponding to a component track to which the component track data box belongs; the space region information refers to a space region of the component track to which the component track data box belongs; and k is a positive integer; and pack the k component tracks and atlas segments corresponding to each component track according to the component track data box, to obtain a target file. Through the above process, a component track data box can be packed in each component track, and the component track data box indicates the relevant information of the component track, which can refine the association between the atlas segment information and the component track (i.e., atlas segment and component track) to the granularity of a single component track, such that the information of the component track can be retained as comprehensively as possible, and the information of the component track in the packed target file can be more organized and refined. Further, After sending the target file to a user device, the user device can select the required component track precisely to achieve the purposes of partial unpacking and partial decoding, such that there is no need to fully unpack and decode the target file, so as to save time and resources consumed on data processing, thus improving the accuracy and efficiency of data processing.

Figure 9:
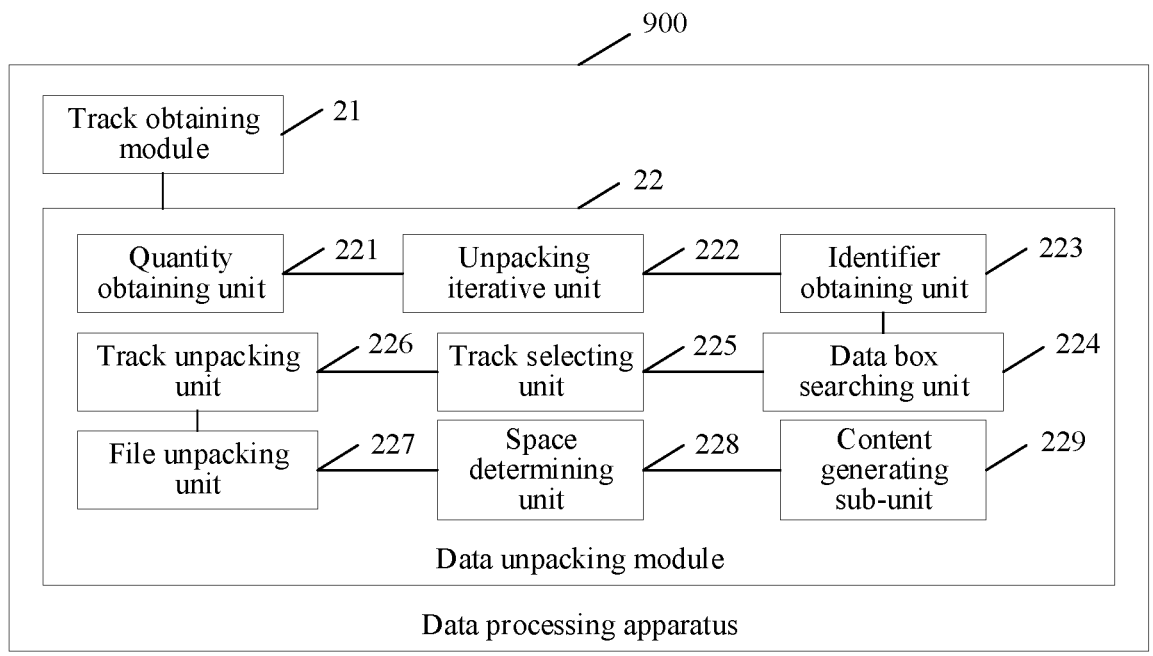
FIG. 9 is a schematic diagram of another data processing apparatus according to an embodiment of this application.

Referring to FIG. 9, FIG. 9 is a schematic structural diagram of a data processing apparatus provided by embodiments of this application. The above data processing apparatus can be a computer-readable instruction (included program code) running in the computer device, for example, the data processing apparatus is an application software; the apparatus can be configured to execute corresponding steps in the method provided in the embodiments of this application. As shown in FIG. 9, a data processing apparatus 900 can be used for the computer device in the embodiment corresponding FIG. 6. Specifically, The apparatus may include: a track obtaining module 21 and a data unpacking module 22.

A track obtaining module 21 is configured to obtain k component tracks in a target file; the component track includes a component track data box, which includes a segment quantity and space region information; the segment quantity refers to a quantity of atlas segments corresponding to a component track to which the component track data box belongs; the space region information refers to a space region of the component track to which the component track data box belongs; and k is a positive integer; and a data unpacking module 22 is configured to unpack the target file according to the component track data box, to obtain a segment display content.

The data unpacking module 22 includes:

a quantity obtaining unit 221, configured to, when responding to a display request for a target component track, obtain a target component track data box included in the target component track from the target file, and obtain a target segment quantity corresponding to the target component track from the target component track data box;

an unpacking iterative unit 222, configured to perform h iterative unpacking's on the target file based on the target segment quantity to obtain the segment display content corresponding to the target component track; and h being the target segment quantity.

The data unpacking module 22 includes:

an identifier obtaining unit 223, configured to obtain an atlas segment identifier to be processed of the atlas segment to be processed, when responding to a display request for an atlas segment to be processed;

a data box searching unit 224, configured to obtain component track data boxes respectively included in the k component tracks from the target file, and based on the segment quantity and the atlas segment identifier to be processed in the component track data box, perform traverse searching on the component track data boxes respectively included in the k component tracks;

a track selecting unit 225, configured to determine a searched component track to which the component track data box of the atlas segment identifier to be processed belongs as a component track to be processed.

a track unpacking unit 226, configured to unpack the component track to be processed to obtain a segment display content corresponding to the atlas segment to be processed.

The data unpacking module 22 includes:

a file unpacking unit 227, configured to unpack a target file according to the component track data box, to obtain the k component tracks and atlas segments corresponding to each component track;

a space determining unit 228, configured to determine a space region where the k component tracks are located in a volumetric video based on space region information in the component track data box included in the k component tracks respectively; and a content generating unit 229, configured to generate the segment display content, according to the space region where the k component tracks are located in the volumetric video and the atlas segments corresponding to each component track.

The embodiment of this application provides a data processing apparatus, which can obtain k component tracks in a target file; the component track includes a component track data box, which includes a segment quantity and space region information; the segment quantity refers to a quantity of atlas segments corresponding to a component track to which the component track data box belongs; the space region information refers to a space region of the component track to which the component track data box belongs; and k is a positive integer; and unpack the target file according to the component track data box, to obtain a segment display content. Through the above-mentioned process, a component track data box can be packed in each component track, and the component track data box indicates the relevant information of the component track; the association between the atlas segment information and the component track (i.e., the atlas segment and component track) can be refined to the granularity of a single component track. After receiving the target file, the user device can obtain the information of each component track based on the component track data box of each component track at the granularity of a single component track, and the user device can perform operations such as unpacking and decoding of the needed part in the target file according to requirements, which can save the time and resources consumed on data processing, thus improving the accuracy and efficiency of data processing.

Figure 10:
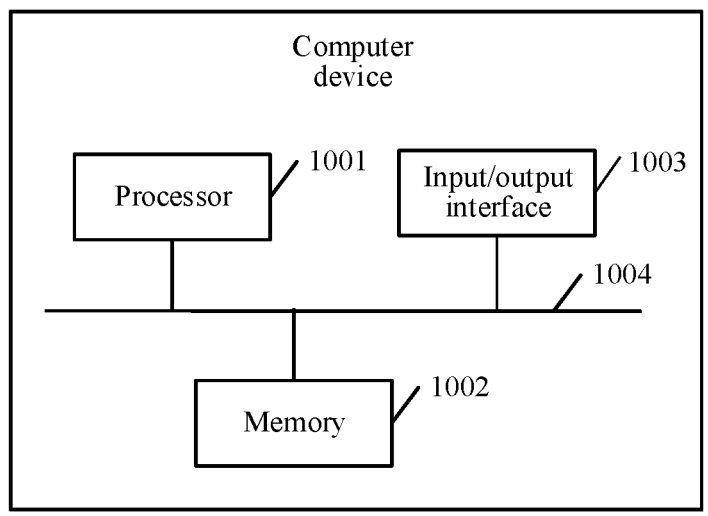
FIG. 10 is a schematic structural diagram of a computer device according to an embodiment of this application.

Referring to FIG. 10, FIG. 10 is a schematic structural diagram of a computer device according to the embodiment of this application. As shown in FIG. 10, the computer device in the embodiment of this application can include: one or more processors 1001, a memory 1002, and an input/output interface 1003. The processor 1001, memory 1002, and input/output interface 1003 are connected via a bus 1004. The memory 1002 is configured to store a computer-readable instruction, the computer-readable instruction includes a program instruction, and the input/output interface 1003 is configured to receive data and output data, and implement data interaction between the computer device and the user device. The processor 1001 is configured to execute a program instruction stored in the memory 1002.

The processor 1001, when located in a computer device, performs the following operations:

obtaining k component tracks and atlas segments corresponding to each component track; the component track including a component track data box, which includes a segment quantity and space region information; the segment quantity referring to a quantity of atlas segments corresponding to a component track to which the component track data box belongs; the space region information referring to a space region of the component track to which the component track data box belongs; k being a positive integer; and packing the k component tracks and the atlas segments corresponding to each component track according to the component track data box, to obtain a target file.

Or, the processor 1001, when located in the user device, performs the following operations:

obtaining k component tracks in a target file; the component track including a component track data box, which includes a segment quantity and space region information; the segment quantity referring to a quantity of atlas segments corresponding to a component track to which the component track data box belongs; the space region information referring to a space region of the component track to which the component track data box belongs; k being a positive integer; and unpacking the target file according to the component track data box, to obtain a segment display content.

In some possible implementations, the processor 1001 may be a central processing unit (CPU). The processor may also be other general purpose processors, a digital signal processor (DSP), an application specific integrated circuit (ASIC), a field-programmable gate array (FPGA), or other programmable logic devices, a discrete gate or a transistor logic device, a discrete hardware component, and the like. The general purpose processor may be a microprocessor, or the processor may also be any conventional processor or the like.

The memory 1002 may include a read-only memory and a random-access memory, and provide an instruction and data to the processor 1001 and the input/output interface 1003. A part of the memory 1002 may further include a non-volatile random-access memory. For example, the memory 1002 may further store information of a device type.

In a specific implementation, the computer device may execute the implementations provided in the various steps of FIG. 4 or FIG. 6 above through its various built-in functional modules. Please refer to the implementations provided in the various steps of FIG. 4 or FIG. 6 above for detail, which will not be repeated herein.

The embodiment of this application provides a computer device, which includes: one or more processors, an input/output interface, and a memory, a computer instruction in the memory being obtained through the processor, to execute various steps of the method shown in FIG. 4 or FIG. 6 above, to perform a data processing operation. The embodiment of this application can relate to packing a component track data box in each component track, and the component track data box indicates the relevant information of the component track; the association between the atlas segment information and the component track (i.e., the atlas segment and component track) can be refined to the granularity of a single component track, such that the information of the component track can be retained as comprehensively as possible, and the information of the component track in the packed target file can also be more organized and refined. Further, after sending the target file to a user device, the user device can select the required component track precisely to achieve the purposes of partial unpacking and partial decoding, such that there is no need to fully unpack and decode the target file fully, so as to save time and resources consumed on data processing, thus improving the accuracy and efficiency of data processing.

The embodiment of this application further provides one or more computer-readable storage media, the computer-readable storage medium stores a computer-readable instruction, and the computer-readable instruction includes a program instruction. When executed by the one or more processors, the program instruction can implement the data processing method provided in the various steps of FIG. 4 or FIG. 6. As can be seen in the implementations provided in the various steps of FIG. 4 or FIG. 6 above, which will not be repeated herein. In addition, the description of beneficial effects of the same method are not described herein again. For the technical details that are not disclosed in the computer-readable storage medium embodiments involved in this application, please refer to the description of the method embodiments of this application. As an example, the program instruction may be deployed to execute on one computing device or execute on a plurality of computing devices located in one location, and alternatively, executed on a plurality of computer devices distributed in a plurality of locations and interconnected through communication networks.

According to an aspect of the embodiments of this application, a computer program product is provided, which includes a computer-readable instruction, when being executed by one or more processors, the computer-readable instruction implements steps of a method of the embodiments of this application.

The computer-readable storage medium may be the data processing apparatus provided by any of the foregoing embodiments or an internal storage unit of the computer device, such as a hard disk or an internal memory of the computer device. The computer-readable storage medium may also be an external storage device of the computer device, such as a plug-in hard disk, a smart media card (SMC), a secure digital (SD) card, and a flash card equipped on the computer device. Further, the computer-readable storage medium may also include both an internal storage unit of the computer device and also includes an external storage device. The computer-readable storage medium is configured to store the computer-readable instruction and other programs and data required by the computer device. The computer-readable storage medium may also be configured to temporarily store data that has been outputted or will be outputted.

In the description, the claims, and the drawings of embodiments of this application, the term "include" and any variant thereof are intended to cover non-exclusive inclusion. For example, a process, method, apparatus, product or device including a series of steps or units is not limited to the listed steps or modules, but may further include steps or modules that are not listed, or further include other steps and units inherent to the process, method, apparatus, product or device.

A person skilled in the art may understand that the units and algorithm steps of each example described in combination with the embodiments disclosed herein may be implemented by electronic hardware, computer software or a combination thereof. To clearly illustrate the interchangeability of hardware and software, the composition and steps of each example have been generally described in accordance with the functions in the foregoing description. Whether these functions are implemented in hardware or software depends on the specific application and design constraints of the technical solution. A person skilled in the art may use different methods to implement the described functions for each specific application, but such implementation may not be considered beyond the scope of this application.

The method and related apparatus provided by the embodiments of this application are described with reference to the method flowchart diagram and/or structural schematic diagram provided by the embodiments of this application. Specifically, each flowchart and/or block in the method flowchart diagram and/or structural schematic diagram and the combination of flowchart and/or block in the flowchart diagram and/or block diagram may be implemented by computer-readable instructions. These computer-readable instructions may be provided to a processor of a general-purpose computer, a special-purpose computer, an embedded processor or other programmable data processing devices to generate a machine, so that the instructions are executed by the processor of a computer or other programmable data processing devices to generate an apparatus for implementing the functions specified in one or more processes in the flowchart and/or in one or more blocks in the structural schematic diagram. These computer-readable instructions may also be stored in a computer-readable memory that may direct a computer or other programmable data processing devices to work in a particular manner, so that the instructions stored in the computer-readable memory produce a manufacturing product including an instruction apparatus, which implements the functions specified in one or more processes in the flowchart and/or in one or more blocks in the structural schematic diagram. These computer-readable instructions may also be loaded onto a computer or other programmable data processing devices, so that a series of operation steps are implemented on the computer or other programmable devices to generate computer-implemented processing, and thus the instructions executed on the computer or other programmable devices provide steps for implementing the functions specified in one or more processes in the flowchart and/or in one or more blocks in the structural schematic diagram.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules. Moreover, each module or unit can be part of an overall module that includes the functionalities of the module or unit. The above disclosure is only exemplary embodiments of this application, and the scope of the claims of this application cannot be limited thereto. Therefore, the equivalent changes made according to the claims of this application still fall within the scope of this application.

What is claimed is:

1. A data processing method, executed by a computer device, comprising:
    obtaining k component tracks in a target file, each component track having a component track data box, which comprises a segment quantity and space region information; the segment quantity referring to a quantity of atlas segments corresponding to the component track to which the component track data box belongs; the space region information referring to a space region of the component track to which the component track data box belongs; k being a positive integer; and
    unpacking the target file according to each component track data box, to obtain a corresponding segment display content.

2. The method according to claim 1, wherein the unpacking the target file according to each component track data box, to obtain a corresponding segment display content comprises:
    responding to a display request for a target component track, obtaining a target component track data box comprised in the target component track from the target file, and obtaining a quantity of target segments corresponding to the target component track from the target component track data box; and
    based on the quantity of target segments, performing h iterative unpacking's on the target file to obtain the segment display content corresponding to the target component track; and h being the target segment quantity.

3. The method according to claim 1, wherein the unpacking the target file according to each component track data box, to obtain a corresponding segment display content comprises:
    responding to a display request for an atlas segment to be processed, obtaining an atlas segment identifier to be processed of the atlas segment to be processed;
    obtaining component track data boxes respectively comprised in the k component tracks from the target file;
    based on the segment quantity and the atlas segment identifier to be processed in the component track data box, performing traverse searching on the component track data boxes respectively comprised in the k component tracks;
    determining a searched component track to which the component track data box of the atlas segment identifier to be processed as a component track to be processed;
    unpacking the component track to be processed to obtain a segment display content corresponding to the atlas segment to be processed.

4. The method according to claim 1, wherein the unpacking the target file according to each component track data box, to obtain a corresponding segment display content comprises:
    unpacking the target file according to the component track data box, to obtain the k component tracks and atlas segments corresponding to each component track;
    determining a space region where the k component tracks are located in a volumetric video based on space region information in the component track data box comprised in the k component tracks, respectively; and
    according to the space region where the k component tracks are located in the volumetric video and the atlas segments corresponding to each component track, generating a segment display content.

5. The method according to claim 1, wherein each component track further comprises a component track type; the k component tracks comprise a first component track and a second component track; and
    when a first component track type of the first component track is the same as a second component track type of the second component track, the atlas segments corresponding to the first component track and the atlas segments corresponding to the second component track belong to the same segment track group.

6. The method according to claim 1, wherein the component track data box comprises a component information data box, the component information data box comprises a data box type that indicates information of the component track to which the component information data box belongs; the k component tracks comprises a target component track; and
    when the component information data box is packed in the target component track, the component information data box comprises atlas segments corresponding to the target component track and space region information.

7. A computer device, comprising one or more processors, a memory, and an input/output interface; and
the processors being respectively connected to the memory and the input/output interface, wherein the input/output interface is configured to receive data and output data, the memory is configured to store a plurality of computer-readable instructions that, when executed by the processors, cause the computer device to perform a data processing method including:
obtaining k component tracks in a target file, each component track having a component track data box, which comprises a segment quantity and space region information; the segment quantity referring to a quantity of atlas segments corresponding to the component track to which the component track data box belongs; the space region information referring to a space region of the component track to which the component track data box belongs; k being a positive integer; and
unpacking the target file according to each component track data box, to obtain a corresponding segment display content.

8. The computer device according to claim 7, wherein the unpacking the target file according to each component track data box, to obtain a corresponding segment display content comprises:
responding to a display request for a target component track, obtaining a target component track data box comprised in the target component track from the target file, and obtaining a quantity of target segments corresponding to the target component track from the target component track data box; and
based on the quantity of target segments, performing h iterative unpacking's on the target file to obtain the segment display content corresponding to the target component track; and h being the target segment quantity.

9. The computer device according to claim 7, wherein the unpacking the target file according to each component track data box, to obtain a corresponding segment display content comprises:
responding to a display request for an atlas segment to be processed, obtaining an atlas segment identifier to be processed of the atlas segment to be processed;
obtaining component track data boxes respectively comprised in the k component tracks from the target file;
based on the segment quantity and the atlas segment identifier to be processed in the component track data box, performing traverse searching on the component track data boxes respectively comprised in the k component tracks;
determining a searched component track to which the component track data box of the atlas segment identifier to be processed as a component track to be processed;
unpacking the component track to be processed to obtain a segment display content corresponding to the atlas segment to be processed.

10. The computer device according to claim 7, wherein the unpacking the target file according to each component track data box, to obtain a corresponding segment display content comprises:
unpacking the target file according to the component track data box, to obtain the k component tracks and atlas segments corresponding to each component track;
determining a space region where the k component tracks are located in a volumetric video based on space region information in the component track data box comprised in the k component tracks, respectively; and
according to the space region where the k component tracks are located in the volumetric video and the atlas segments corresponding to each component track, generating a segment display content.

11. The computer device according to claim 7, wherein each component track further comprises a component track type; the k component tracks comprise a first component track and a second component track; and
when a first component track type of the first component track is the same as a second component track type of the second component track, the atlas segments corresponding to the first component track and the atlas segments corresponding to the second component track belong to the same segment track group.

12. The computer device according to claim 7, wherein the component track data box comprises a component information data box, the component information data box comprises a data box type that indicates information of the component track to which the component information data box belongs; the k component tracks comprises a target component track; and
when the component information data box is packed in the target component track, the component information data box comprises atlas segments corresponding to the target component track and space region information.

13. One or more non-transitory computer-readable storage media, storing a plurality of computer-readable instructions that, when executed by one or more processors of a computer device, cause the computer device to perform a data processing method including:
obtaining k component tracks in a target file, each component track having a component track data box, which comprises a segment quantity and space region information; the segment quantity referring to a quantity of atlas segments corresponding to the component track to which the component track data box belongs; the space region information referring to a space region of the component track to which the component track data box belongs; k being a positive integer; and
unpacking the target file according to each component track data box, to obtain a corresponding segment display content.

14. The non-transitory computer-readable storage media according to claim 13, wherein the unpacking the target file according to each component track data box, to obtain a corresponding segment display content comprises:
responding to a display request for a target component track, obtaining a target component track data box comprised in the target component track from the target file, and obtaining a quantity of target segments corresponding to the target component track from the target component track data box; and
based on the quantity of target segments, performing h iterative unpacking's on the target file to obtain the segment display content corresponding to the target component track; and h being the target segment quantity.

15. The non-transitory computer-readable storage media according to claim 13, wherein the unpacking the target file according to each component track data box, to obtain a corresponding segment display content comprises:
responding to a display request for an atlas segment to be processed, obtaining an atlas segment identifier to be processed of the atlas segment to be processed;

obtaining component track data boxes respectively comprised in the k component tracks from the target file;

based on the segment quantity and the atlas segment identifier to be processed in the component track data box, performing traverse searching on the component track data boxes respectively comprised in the k component tracks;

determining a searched component track to which the component track data box of the atlas segment identifier to be processed as a component track to be processed;

unpacking the component track to be processed to obtain a segment display content corresponding to the atlas segment to be processed.

16. The non-transitory computer-readable storage media according to claim 13, wherein the unpacking the target file according to each component track data box, to obtain a corresponding segment display content comprises:

unpacking the target file according to the component track data box, to obtain the k component tracks and atlas segments corresponding to each component track;

determining a space region where the k component tracks are located in a volumetric video based on space region information in the component track data box comprised in the k component tracks, respectively; and according to the space region where the k component tracks are located in the volumetric video and the atlas segments corresponding to each component track, generating a segment display content.

17. The non-transitory computer-readable storage media according to claim 13, wherein each component track further comprises a component track type; the k component tracks comprise a first component track and a second component track; and when a first component track type of the first component track is the same as a second component track type of the second component track, the atlas segments corresponding to the first component track and the atlas segments corresponding to the second component track belong to the same segment track group.

18. The non-transitory computer-readable storage media according to claim 13, wherein the component track data box comprises a component information data box, the component information data box comprises a data box type that indicates information of the component track to which the component information data box belongs; the k component tracks comprises a target component track; and when the component information data box is packed in the target component track, the component information data box comprises atlas segments corresponding to the target component track and space region information.

* * * * *